United States Patent
Hsu et al.

(10) Patent No.: US 11,540,297 B2
(45) Date of Patent: Dec. 27, 2022

(54) WIRELESS COMMUNICATION METHOD AND ASSOCIATED WIRELESS DEVICE

(71) Applicant: MEDIATEK INC., Hsin-Chu (TW)

(72) Inventors: Tsai-Yuan Hsu, Hsin-Chu (TW); Pei-Wen Hung, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 162 days.

(21) Appl. No.: 16/868,505

(22) Filed: May 6, 2020

(65) Prior Publication Data
US 2020/0374895 A1 Nov. 26, 2020

Related U.S. Application Data

(60) Provisional application No. 62/852,362, filed on May 24, 2019.

(51) Int. Cl.
*H04W 4/00* (2018.01)
*H04W 72/12* (2009.01)
*H04W 4/80* (2018.01)
H04W 84/12 (2009.01)

(52) U.S. Cl.
CPC ............. *H04W 72/12* (2013.01); *H04W 4/80* (2018.02); *H04W 84/12* (2013.01)

(58) Field of Classification Search
CPC ........ H04W 72/12; H04W 84/12; H04W 4/80
USPC ......................................... 370/329, 338, 235
See application file for complete search history.

(56) References Cited

U.S. PATENT DOCUMENTS

| | | | | |
|---|---|---|---|---|
| 8,045,922 B2* | 10/2011 | Sherman | ............... | H04W 16/14 455/41.2 |
| 8,526,388 B1* | 9/2013 | Kaukovuori | ........ | H04W 72/082 370/329 |
| 8,750,926 B2* | 6/2014 | Fu | .......................... | H04B 1/406 455/553.1 |
| 8,787,468 B2* | 7/2014 | Truong | ............. | H04W 72/1215 375/259 |
| 8,831,655 B2* | 9/2014 | Burchill | ................. | H04B 15/00 455/501 |
| 8,838,046 B2* | 9/2014 | Fu | ........................ | H04W 52/244 455/88 |
| 8,886,239 B2* | 11/2014 | Dayal | ............... | H04W 72/1215 455/509 |
| 9,155,127 B1* | 10/2015 | de la Broise | .......... | H04B 1/406 |
| 9,209,652 B2* | 12/2015 | Imes | ................... | G05D 23/1905 |
| 9,380,596 B2 | 6/2016 | Ko | | |
| 9,408,149 B2* | 8/2016 | Lee | .................... | H04W 52/0235 |
| 9,762,482 B2* | 9/2017 | Sukumar | ................. | H04L 5/003 |
| 10,050,735 B2* | 8/2018 | Sun | ...................... | H04W 74/002 |
| 10,237,746 B2* | 3/2019 | Fischer | ................. | H04W 16/14 |

(Continued)

*Primary Examiner* — Marceau Milord
(74) *Attorney, Agent, or Firm* — Winston Hsu

(57) ABSTRACT

The present invention provides a wireless communication method of a wireless device, wherein the wireless device includes a first wireless module and a second wireless module, and the wireless communication method includes the steps of: using the first wireless module to receive frame exchange information from the second wireless module, wherein the frame exchange information comprises timing of signal transmission and signal reception of the second wireless module; and scheduling signal transmission and signal reception of the first wireless module according to the frame exchange information of the second wireless module.

6 Claims, 6 Drawing Sheets

(56) References Cited

U.S. PATENT DOCUMENTS

| | | | | |
|---|---|---|---|---|
| 2009/0137206 A1* | 5/2009 | Sherman | ............... | H04W 16/14 |
| | | | | 455/41.2 |
| 2011/0097998 A1* | 4/2011 | Ko | ...................... | H04W 72/04 |
| | | | | 455/552.1 |
| 2012/0170557 A1* | 7/2012 | Tsfati | ............... | H04W 72/1215 |
| | | | | 370/338 |
| 2014/0036882 A1* | 2/2014 | Baghel | ................. | H04B 1/1027 |
| | | | | 370/336 |
| 2014/0161031 A1* | 6/2014 | Grunert | ................... | H04L 1/203 |
| | | | | 370/328 |
| 2014/0293912 A1* | 10/2014 | Chao | ..................... | H04L 5/0078 |
| | | | | 370/329 |
| 2015/0023160 A1* | 1/2015 | Alisawi | ................. | H04L 67/322 |
| | | | | 370/230 |
| 2016/0073344 A1* | 3/2016 | Vutukuri | ................. | H04L 5/001 |
| | | | | 370/252 |
| 2016/0119935 A1* | 4/2016 | Wilhelmsson | ........ | H04W 72/12 |
| | | | | 370/329 |
| 2016/0150357 A1* | 5/2016 | Jung | ................. | H04W 52/0206 |
| | | | | 455/41.1 |
| 2016/0174280 A1 | 6/2016 | Singh | | |
| 2017/0142592 A1* | 5/2017 | Fischer | ............. | H04W 72/1263 |
| 2019/0037427 A1* | 1/2019 | Yerramalli | ............ | H04W 72/04 |
| 2019/0223193 A1* | 7/2019 | Su | ...................... | H04W 72/1215 |
| 2020/0025865 A1* | 1/2020 | Gulati | ..................... | G01S 13/42 |
| 2020/0028656 A1* | 1/2020 | Gulati | ..................... | G01S 7/023 |
| 2021/0083942 A1* | 3/2021 | Finkelstein | ......... | H04L 41/0896 |
| 2021/0152295 A1* | 5/2021 | Falconetti | ................. | H04L 5/14 |
| 2021/0256833 A1* | 8/2021 | Daoura | ................. | H04W 4/029 |

\* cited by examiner

WIRELESS COMMUNICATION METHOD AND ASSOCIATED WIRELESS DEVICE

CROSS REFERENCE TO RELATED APPLICATIONS

This application claims the priority of U.S. Provisional Application No. 62/852,362, filed on May 24, 2019, which is included herein by reference in its entirety.

BACKGROUND

The current wireless device generally comprises at least two wireless modules such as Wi-Fi module and Bluetooth (BT) module. To avoid signal collision, the wireless modules may select non-overlapping channels and use frequency division duplex (FDD) method to transmit/receive data. In the FDD coexistence of the wireless modules, a transmitting signal of one wireless module will degrade a receiving signal of another wireless module, even if the wireless modules work on non-overlapping channels. In addition, the antenna isolation becomes smaller in the current wireless device, and the smaller antenna isolation may worsen the interference between the wireless modules.

SUMMARY

It is therefore an objective of the present invention to provide a wireless communication method, which can align the signal transmissions of two wireless modules, or align the signal receptions of two wireless modules, to solve the above-mentioned problems.

According to one embodiment of the present invention, a wireless communication method of a wireless device is disclosed, wherein the wireless device comprises a first wireless module and a second wireless module, and the wireless communication method comprises the steps of: using the first wireless module to receive frame exchange information from the second wireless module, wherein the frame exchange information comprises timing of signal transmission and signal reception of the second wireless module; and scheduling signal transmission and signal reception of the first wireless module according to the frame exchange information of the second wireless module.

According to another embodiment of the present invention, a wireless device comprises a first wireless module and a second wireless module is disclosed. In the operations of the wireless device, the first wireless module receives frame exchange information from the second wireless module, wherein the frame exchange information comprises timing of signal transmission and signal reception of the second wireless module; and the first wireless module schedules signal transmission and signal reception of the first wireless module according to the frame exchange information of the second wireless module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
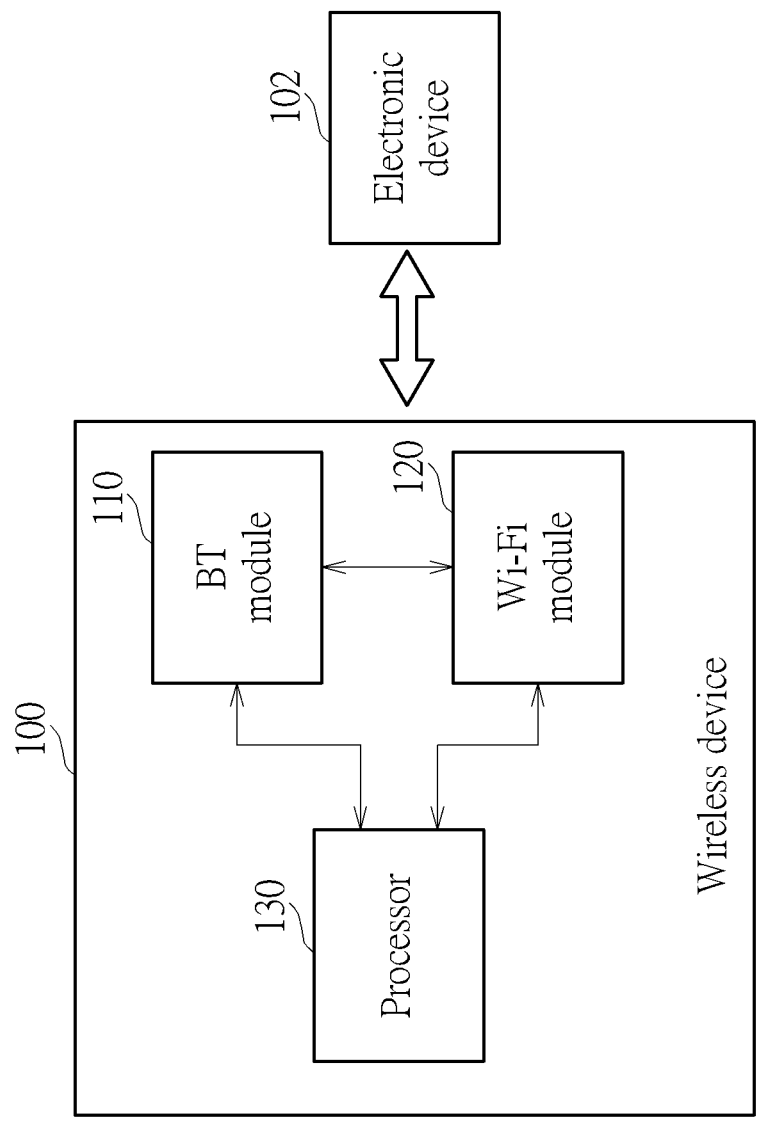
FIG. 1 is a diagram illustrating a wireless device according to one embodiment of the present invention.

FIG. 1 is a diagram illustrating a wireless device 100 according to one embodiment of the present invention. As shown in FIG. 1, the wireless device 100 comprises two wireless modules (in this embodiment, the wireless modules are BT module 110 and Wi-Fi module 120) and a processor 130. In this embodiment, the wireless device 100 can be a cell phone, a tablet, a notebook, or any other electronic device capable of wirelessly communicating with one or more electronic devices such as the electronic device 102.

In order to lower the interference between the BT module 110 and the Wi-Fi module 120, in one embodiment, the Wi-Fi module 120 may send frame exchange information to the BT module 110 to notify timing of the signal transmission and signal reception of the Wi-Fi module 120, and the BT module 110 can schedule its signal transmission and signal reception by referring to the frame exchange information of the Wi-Fi module 120, so as to make the signal transmission time of the BT module 110 align the signal transmission time of the Wi-Fi module 120, and/or to make the signal reception time of the BT module 110 align the signal reception time of the Wi-Fi module 120. In another embodiment, the BT module 110 may send frame exchange information to the Wi-Fi module 120 to notify timing of the signal transmission of the BT module 110, and the Wi-Fi module 120 can schedule its signal transmission by referring to the frame exchange information of the BT module 110, so as to make the signal transmission time of the Wi-Fi module 120 align the signal transmission time of the BT module 110. In light of above, by controlling the BT module 110 and the Wi-Fi module 120 to have the signal transmission and/or the signal reception concurrently as much as possible, the signal reception of the BT module 110 may not suffer the interference or only suffer little interference due to the signal transmission of the Wi-Fi module 120, and/or the signal reception of the Wi-Fi module 120 may not suffer the interference or only suffer little interference due to the signal transmission of the BT module 110, and the overall signal quality of the wireless device 100 becomes better.

Figure 2:
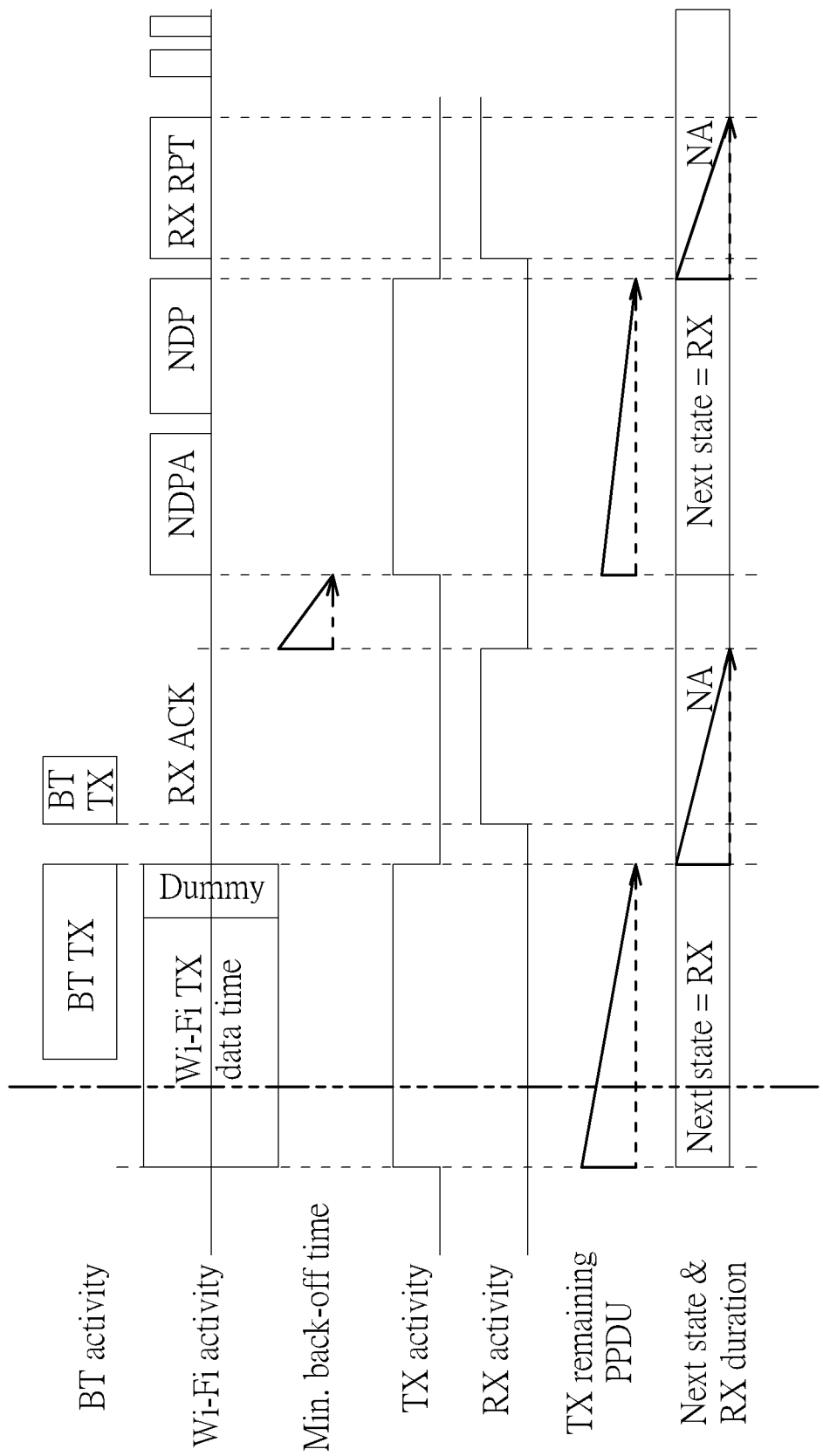
FIG. 2 shows a timing diagram of the BT module and the Wi-Fi module according to a first embodiment of the present invention.

FIG. 2 shows a timing diagram of the BT module 110 and the Wi-Fi module 120 according to a first embodiment of the present invention. In this embodiment, the Wi-Fi module 120 sends the frame exchange information to the BT module 110, wherein the frame exchange information comprises a minimum back-off time of all access category (AC) queues, a signal transmission (TX) activity indicator, a signal reception (RX) indicator (predicted RX indicator), a TX remaining physical layer protocol data unit (PPDU) when TX activity is on, a prediction of a next stage and a response RX remaining PPDU when the RX activity is on. After receiving the frame exchange information of the Wi-Fi module 120, the BT module 110 refers to the frame exchange information to schedule its signal transmission time and signal reception time. Specifically, the BT module 110 can start the signal transmission during the signal transmission of the Wi-Fi module 120, and in one embodiment, the BT module 110 have the signal transmission during the signal transmission of the Wi-Fi module 120. If the ends of the signal transmissions of the BT module 110 and the Wi-Fi module 120 are not aligned, the Wi-Fi module 120 may add dummy subframes to the end of data of the signal transmission to align a slot time boundary of the BT module 110, as shown in FIG. 2. In addition, the BT module 110 can start the signal reception at the beginning of the signal reception of the Wi-Fi module 120, that is the beginning of the signal reception of the BT module 110 aligns the beginning of the signal reception of the Wi-Fi module 120. Similarly, the BT module 110 may refer to the frame exchange information of the Wi-Fi module 120 to have the signal transmission when the Wi-Fi module 120 transmits a null data packet announcement (NDPA) and a null data packet (NDP); and the BT module 110 may further refer to the frame exchange information of the Wi-Fi module 120 to have the signal reception when the Wi-Fi module 120 receives a report in response to the NDP.

Figure 3:
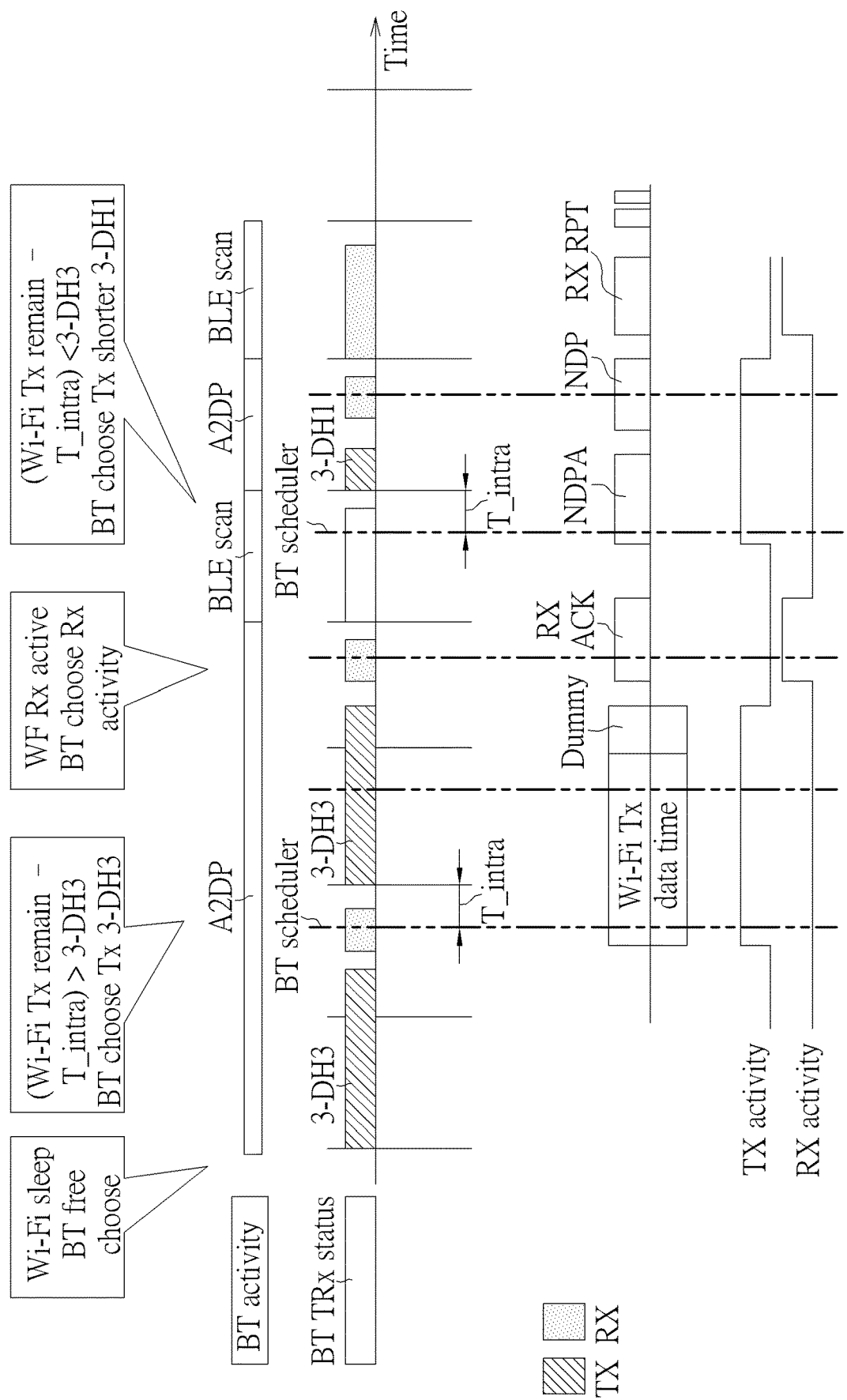
FIG. 3 is an alternative embodiment of the BT module and the Wi-Fi module shown in FIG. 2.

In an alternative embodiment, referring to FIG. 3, initially the Wi-Fi module 120 operates in a sleep mode, so the BT module 110 can freely choose the signal transmission and the signal reception (FIG. 3 shows the BT module 110 transmits the signals with packet type "3-DH3" defined in BT specification). Then, the Wi-Fi module 120 sends the frame exchange information to the BT module 110 to notify the timing of the signal transmission and the signal reception as shown in FIG. 2, and the BT module 110 refers to the timing and length of the signal transmission of the Wi-Fi module 120 to select a suitable packet type. In this embodiment, because a difference between a remaining signal transmission time of the Wi-Fi module 120 and a period T_intra is greater than a length of the packet type "3-DH3", the BT module 110 selects the packet type "3-DH3", and starts the signal transmission at the frame boundary, and receives a response after the packets are successfully transmitted. In the embodiment shown in FIG. 3, the time axis marks a plurality of intervals, each interval represents a frame period having about 1.25 ms (milli-second), and the period T_intra is a difference between a scheduling time and the frame boundary. Then, the BT module 110 refers to the signal reception time of the Wi-Fi module 120 to start the signal reception during the signal reception of the Wi-Fi module 120. Then, the BT module 110 refers to the timing and length of the signal transmission (NDPA and NDP) of the Wi-Fi module 120 to select a suitable packet type. In this embodiment, because the difference between the remaining signal transmission time of the Wi-Fi module 120 and the period T_intra is less than the length of the packet type "3-DH3", the BT module 110 selects the packet type "3-DH1" with shorter length, and starts the signal transmission at the frame boundary, and receives a response after the packets are successfully transmitted.

Figure 4:
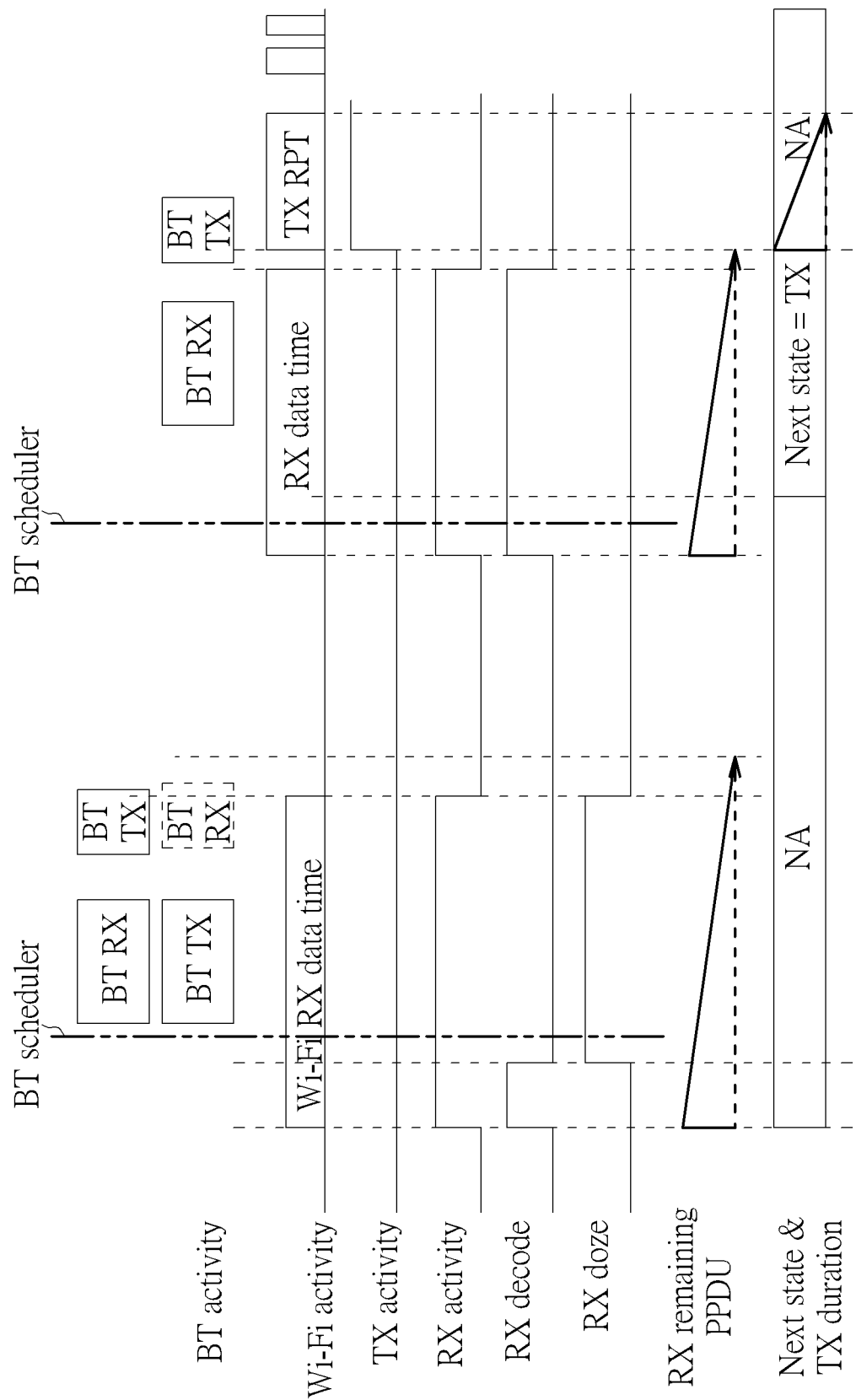
FIG. 4 shows a timing diagram of the BT module and the Wi-Fi module according to a second embodiment of the present invention.

FIG. 4 shows a timing diagram of the BT module 110 and the Wi-Fi module 120 according to a second embodiment of the present invention. In this embodiment, the Wi-Fi module 120 sends the frame exchange information to the BT module 110, wherein the frame exchange information comprises a signal transmission (TX) activity indicator (predicted TX indicator), a signal reception (RX) indicator, a RX decoding state that indicates if the packet is decoding and not allowed to be discarded, a RX doze state that indicates if the Wi-Fi module 120 operations in the sleep mode, a RX remaining PPDU when the RX activity is on, and a prediction of a next stage. After receiving the frame exchange information of the Wi-Fi module 120, the BT module 110 refers to the frame exchange information to schedule its signal transmission time and signal reception time. Specifically, the BT module 110 can start the signal reception during the signal reception of the Wi-Fi module 120, and start the signal transmission during the signal transmission of the Wi-Fi module 120. In this embodiment, in the first signal reception of the Wi-Fi module 120, Wi-Fi module 120 enters the sleep mode because the Wi-Fi module 120 fails to decode the received data, so the BT module 110 freely chooses the signal transmission and the signal reception. In the second signal reception of the Wi-Fi module 120, the BT module 110 can start the signal reception during the signal reception of the Wi-Fi module 120, and the BT module 110 may refer to the frame exchange information of the Wi-Fi module 120 to have the signal transmission when the Wi-Fi module 120 transmits an acknowledgement (ACK) in response to the received data.

Figure 5:
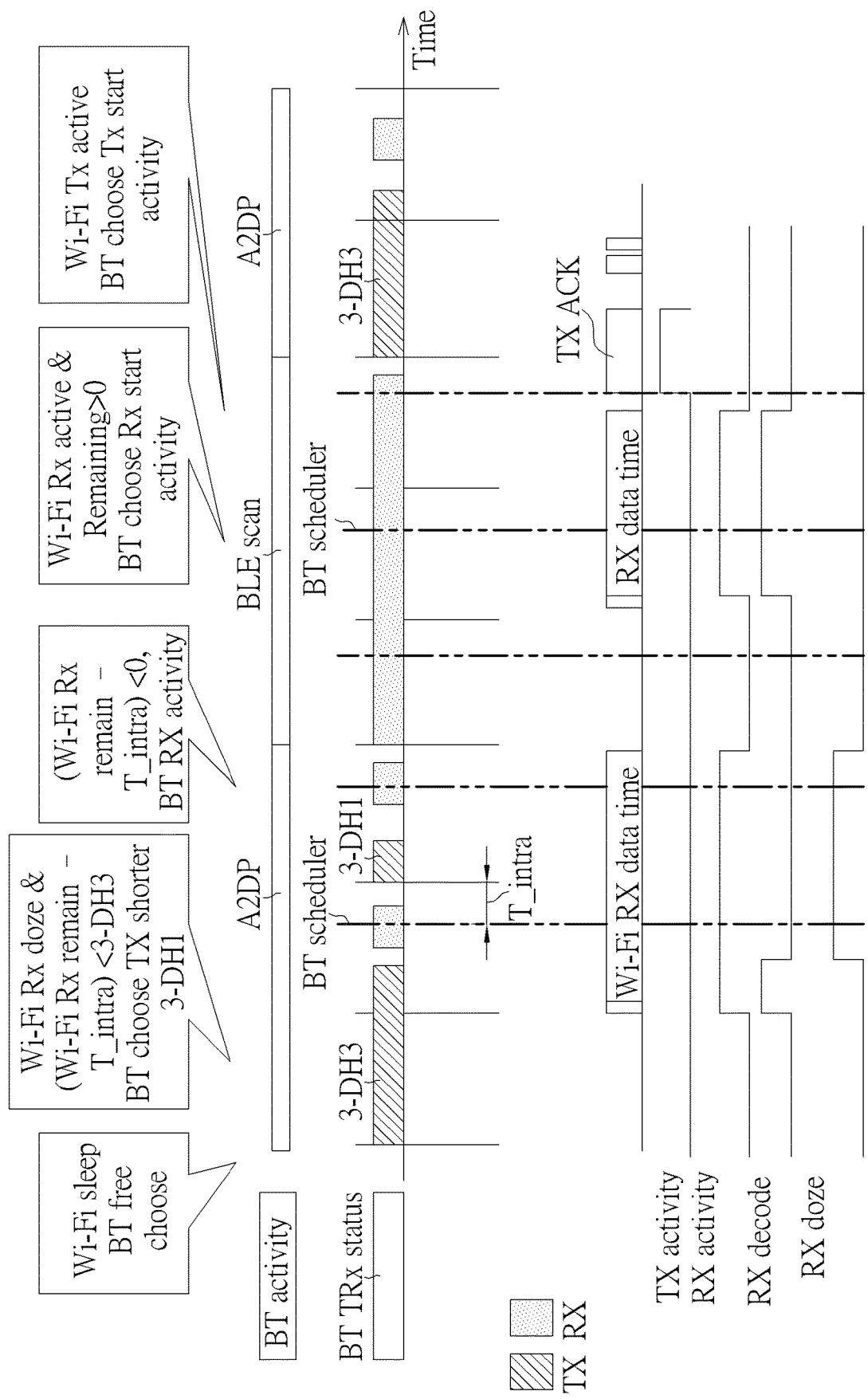
FIG. 5 is an alternative embodiment of the BT module and the Wi-Fi module shown in FIG. 4.

In an alternative embodiment, referring to FIG. 5, initially the Wi-Fi module 120 operates in the sleep mode, so the BT module 110 can freely choose the signal transmission and the signal reception (FIG. 5 shows the BT module 110 transmits the signals with packet type "3-DH3"). Then, the Wi-Fi module 120 sends the frame exchange information to the BT module 110 to notify the timing of the signal transmission and the signal reception as shown in FIG. 4. As shown in FIG. 5, the Wi-Fi module 120 fails to decode the received data and operates in the sleep mode, so the BT module 110 can freely choose the signal transmission and the signal reception, in this embodiment, because a difference between a remaining signal reception time of the Wi-Fi module 120 and a period T_intra is less than a length of the packet type "3-DH3", the BT module 110 selects the packet type "3-DH1", and starts the signal transmission at the frame boundary, and receives a response after the packets are successfully transmitted. In the embodiment shown in FIG. 5, the time axis marks a plurality of intervals, each interval represents a frame period having about 1.25 ms, and the period T_intra is a difference between a scheduling time and the frame boundary. Then, the BT module 110 starts the signal reception when the Wi-Fi module 120 does not have the signal transmission (e.g. the Wi-Fi module 120 is idle and has the signal reception). Finally, the BT module 110 refers to the signal transmission time of the Wi-Fi module 120 to start the signal transmission at the frame boundary, and receives a response after the packets are successfully transmitted.

Figure 6:
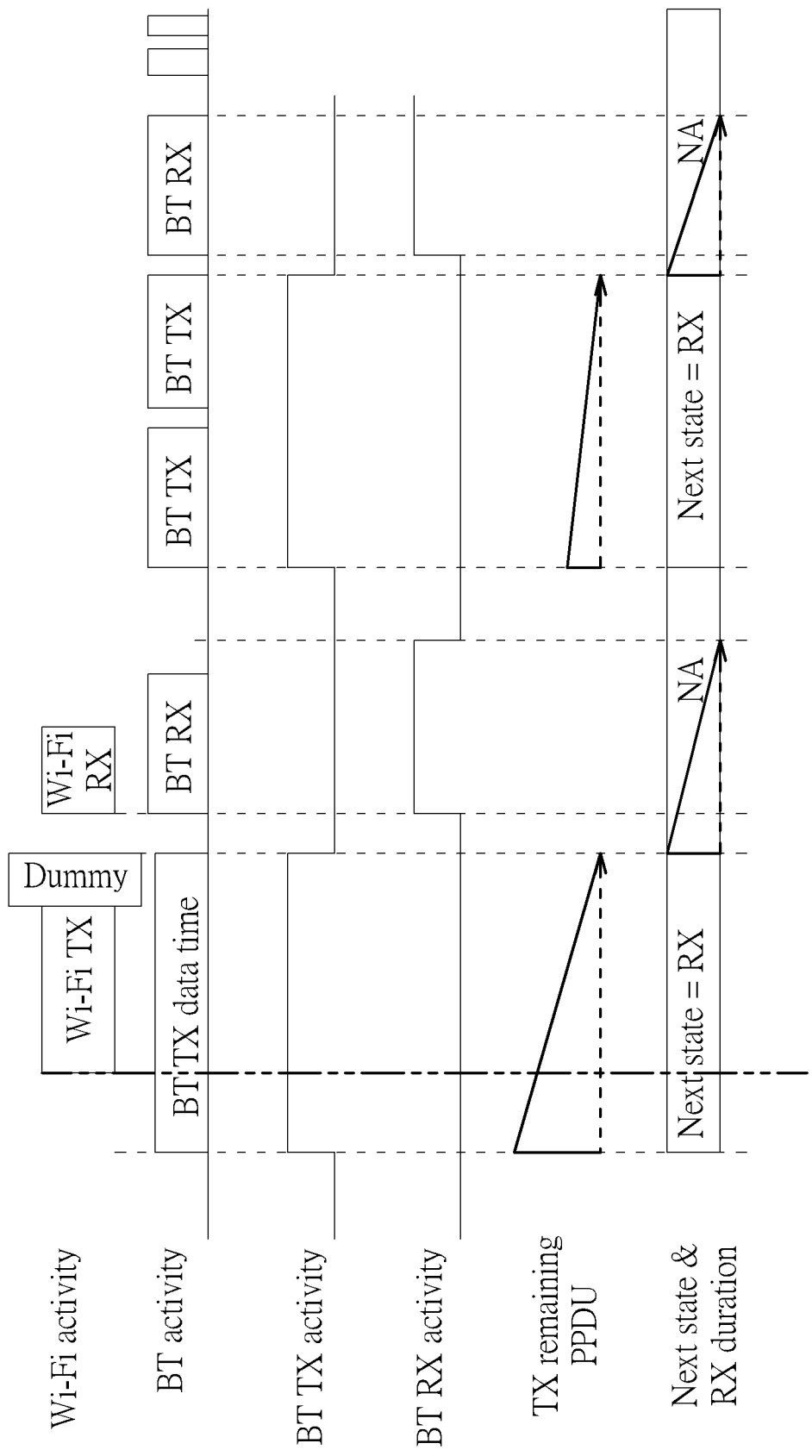
FIG. 6 shows a timing diagram of the BT module and the Wi-Fi module according to a third embodiment of the present invention.

FIG. 6 shows a timing diagram of the BT module 110 and the Wi-Fi module 120 according to a third embodiment of the present invention. In this embodiment, the BT module 110 sends the frame exchange information to the Wi-Fi module 120, wherein the frame exchange information comprises a signal transmission (TX) activity indicator, a signal reception (RX) indicator (predicted RX indicator), a TX remaining physical layer protocol data unit (PPDU) when TX activity is on, a prediction of a next stage and a response RX remaining PPDU when the RX activity is on. After receiving the frame exchange information of the BT module 110, the Wi-Fi module 120 refers to the frame exchange information to schedule its signal transmission time and signal reception time. Specifically, the Wi-Fi module 120 can start the signal transmission during the signal transmission of the BT module 110, and in one embodiment, the Wi-Fi module 120 have the signal transmission during the signal transmission of the BT module 110. If the ends of the signal transmissions of the BT module 110 and the Wi-Fi module 120 are not aligned, the Wi-Fi module 120 may add dummy sub-frames to the end of data of the signal transmission to align a slot time boundary of the BT module 110, as shown in FIG. 6. In addition, the Wi-Fi module 120 can start the signal reception at the beginning of the signal reception of the BT module 110, that is the beginning of the signal reception of the Wi-Fi module 120 aligns the beginning of the signal reception of the BT module 110.

Briefly summarized, in the wireless communication method of the present invention, one wireless module can schedule the signal transmission and the signal reception by referring to the frame exchange information of another wireless module, to make the two wireless modules have the signal transmission and/or the signal reception concurrently as much as possible. Therefore, because of the signal reception of the wireless module may not suffer the interference or only suffer little interference due to the signal transmission of the other wireless module, the overall signal quality of the wireless device becomes better.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of a wireless device, wherein the wireless device comprises a first wireless module and a second wireless module, and the wireless communication method comprises:

using the first wireless module to receive frame exchange information sent by the second wireless module, wherein the frame exchange information comprises timing of signal transmission and timing of signal reception of the second wireless module after the frame exchange information is received by the first wireless module; and scheduling signal transmission and signal reception of the first wireless module according to the frame exchange information of the second wireless module;

wherein the first wireless module is a Wi-Fi module, the second wireless module is a Bluetooth (BT) module, the frame exchange information comprises the timing of the signal transmission of the second wireless module and the timing of a predicted signal reception following the signal transmission of the second wireless module; and the step of scheduling the signal transmission and the signal reception of the first wireless module according to the frame exchange information comprises:

scheduling the signal transmission of the first wireless module to make the first wireless module start the signal transmission during the signal transmission of the second wireless module; and scheduling the signal reception of the first wireless module to make the first wireless module start the signal reception when the second wireless module does not have the signal transmission.

2. The wireless communication method of claim 1, wherein the step of scheduling the signal transmission and the signal reception of the first wireless module according to the frame exchange information comprises:

scheduling the signal transmission and the signal reception of the first wireless module to make the signal transmission of the first wireless module align the signal transmission of the second wireless module, or to make the signal reception of the first wireless module align the signal reception of the second wireless module.

3. The wireless communication method of claim 1, wherein the step of scheduling the signal transmission and the signal reception of the first wireless module according to the frame exchange information comprises:

scheduling the signal transmission of the first wireless module to make the first wireless module have the signal transmission during the signal transmission of the second wireless module; and scheduling the signal reception of the first wireless module to make a beginning of the signal reception of the first wireless module align a beginning of the signal reception of the second wireless module.

4. The wireless communication method of claim 3, further comprising:

adding dummy sub-frames to the end of data of the signal transmission of the first wireless module, to align a slot time boundary of the second wireless module.

5. A wireless device, comprising:

a first wireless module; and a second wireless module;

wherein the first wireless module receives frame exchange information sent by the second wireless module, wherein the frame exchange information comprises timing of signal transmission and timing of signal reception of the second wireless module after the frame exchange information is received by the first wireless module; and the first wireless module schedules signal transmission and signal reception of the first wireless module according to the frame exchange information of the second wireless module;

wherein the first wireless module is a Wi-Fi module, the second wireless module is a Bluetooth (BT) module, the frame exchange information comprises the timing of the signal transmission of the second wireless module and the timing of a predicted signal reception following the signal transmission of the second wireless module; and the first wireless module schedules the signal transmission to start the signal transmission during the signal transmission of the second wireless module; and the first wireless module schedules the signal reception to start the signal reception when the second wireless module does not have the signal transmission.

6. The wireless device of claim 5, wherein the first wireless module schedules the signal transmission and the signal reception to make the signal transmission of the first wireless module align the signal transmission of the second wireless module, or to make the signal reception of the first wireless module align the signal reception of the second wireless module.

\* \* \* \* \*